United States Patent [19]

Klann

[11] Patent Number: 4,709,459

[45] Date of Patent: Dec. 1, 1987

[54] ASSEMBLY DEVICE FOR AXLE BEARINGS AND/OR WHEEL FLANGE HUBS OF MOTOR VEHICLES

[76] Inventor: Horst Klann, Terra Wohnpark 12, 7730 Villingen-Schwenigen 24, BRD, Fed. Rep. of Germany

[21] Appl. No.: 900,369

[22] Filed: Aug. 26, 1986

[30] Foreign Application Priority Data

Aug. 30, 1985 [DE] Fed. Rep. of Germany ....... 3530983

[51] Int. Cl.[4] ................................ B23P 19/04

[52] U.S. Cl. ................................ 29/263; 29/802

[58] Field of Search ................. 29/263, 802, 258, 238, 29/239

[56] References Cited

U.S. PATENT DOCUMENTS 3,662,451 5/1972 Wagner ................................ 29/263

3,762,021 10/1973 Racin ................................ 29/263

4,624,040 11/1986 Sabo ................................ 29/258

FOREIGN PATENT DOCUMENTS 607564 7/1926 France ................................ 29/263

*Primary Examiner*—P. W. Echols

*Attorney, Agent, or Firm*—McGlew and Tuttle

[57] ABSTRACT

An assembly device for the assembly and disassembly of axle bearings of motor vehicles or of wheel flange hubs, makes it possible to press in or pull out the roller bearings to be installed in or pulled out of a cylinder bore of a bearing cylinder while being guided so as to be centered. The assembly device can also press a wheel flange hub into a roller bearing that is already installed in a bearing cylinder. The device has a threaded spindle (1) which is guided and supported in an axial support bearing (2) and is provided with a threaded nut (11) in contact with a pressure transmitting part (8) or counterbearing. The axial support bearing (2) is disposed concentrically in the face wall (3) of a tubular spacer (4) which has on its face opposite the axial support bearing (2), a concentric support shoulder (26). An annular disc provided with an annular extention (8') serves as pressure transmitting part (8).

12 Claims, 5 Drawing Figures

13
12
15
17
18
19
3
4
14
2
20
21
22
6
26
31
35
32
8'
33
8/1
11
1
34

2
17
24
27
23

37
7/1
36
36'
38
39
41
42
40
43

ASSEMBLY DEVICE FOR AXLE BEARINGS AND/OR WHEEL FLANGE HUBS OF MOTOR VEHICLES

FIELD AND BACKGROUND OF THE INVENTION

The invention relates to a device, in particular for axle bearings and/or wheel flange hubs of motor vehicles, with a threaded spindle guided and supported in an axial support bearing and provided with a threaded nut in contact with a pressure transmitting part of counter-bearing.

Pull-off devices are known for roller bearings (Fachkinde Für Metallberufe, 44th edition, page 302, published by Europa-Lehrmittel, 5600 Wuppertal) in which a pull-off spindle is disposed in a cross bar provided with two movable support legs in a central bore, and in which a spreader is disposed on a thinner spindle extension that is rigidly connected to the pull-off spindle. A spreading cone is formed on the prolonged end of the spindle extension which can be pulled axially into the radially spreadable spreader. This spreader is mounted on the thinner spindle section so as to be movable axially and can be moved relative to the spreading cone by means of a nut so that, in its unexpanded state, it can be introduced e.g. into the inner bore of a roller bearing to be pulled off and then be expanded so as to grip the inner roller bearing race from below. By means of a second nut sitting above the cross bar on the threaded spindle, the spindle can be moved axially in a pull-off direction while the two support legs rest on the rim of the bearing seat.

In another pull-off device (same publication as above), a threaded spindle, serving as a pressure transmitting spindle, is screwed into a transversely tapped hole in a draw bar to which are fastened two pulling lugs which are adjustable radially relative to each other. These lugs are diametrically opposite each other in relation to the threaded spindle and have hook-shaped ends that can grip behind the outer cup of a roller bearing while the free end of the pressure transmitting spindle rests against the face of the shaft that is press-fitted in the bearing bore.

These pull-off devices for roller bearings are not suited for the assembly and disassembly of motor vehicle axle bearings or motor vehicle wheel flange hubs. The first mentioned pull-off device has no possibility to put the support legs on the rim of the bearing set because this rim is covered by the flange of the wheel hub, and the second pull-off device has no possibility to apply the pulling lugs to the roller bearing disposed inside a bearing cylinder or to apply the pressure transmitting spindle to an axle face because there is none.

SUMMARY OF THE INVENTION

The invention is based on the problem of providing an assembly device, in particular for the assembly and disassembly of axle bearings of motor vehicles or for the assembly of wheel flange hubs, which can, with a centered guidance, press in or press out the roller bearing to be installed in or pulled out of a cylinder bore of a bearing cylinder. This inventive assembly device makes it possible to press a wheel flange hub into a roller bearing that is already assembled, i.e. one that is inserted in the bearing cylinder.

Accordingly an object of the present invention is to provide an assembly device, in particular for assembling axle bearings and/or wheel flange hubs of motor vehicles, comprising a threaded spindle having an axis of rotation, an axial support bearing coaxial with the axis and having a hole therethrough for receiving the threaded spindle, a tubular spacing having a bore therein, said tubular spacer having a face wall partly closing the bore with a hole therein concentric with said axis, the support bearing being engageable against the face wall, the tubular spacing having an end on an opposite side from its face wall which carries at least one annular support shoulder which is concentric with said axis, and an annular disc provided with an annular centering pilot engaged concentrically to said axis and on said threaded spindle. A nut is threadably engaged on the threaded spindle for pushing the annular disc toward the axial support bearing.

In addition, the invention offers the advantage that handling is equally simple for all three applications, and that the centered, coaxial guidance of the parts to be joined to each other or separated from each other is assured to the same extent in each case.

According to another feature of the invention the face wall has a cylindrical recess for receiving the axial support bearing and holding the axial support bearing in an axially fixed position with respect to the spacer. This not only achieves a simplification and a production cost reduction of the spacer and face wall, it also provides the possibility of exchanging the face wall for another, with another axial support bearing and, possibly, another threaded spindle.

Several support shoulders of different size are also selectively available. This assures the advantageous possibility of applying the assembly device to axle bearings or wheel flange hubs, or the like, of different sizes.

According to other features of the invention, several different annular discs can be provided each having a different configuration with different diameter annular centering pilots. Different support rings can also be provided which carry support shoulders of different diameters and configurations.

One of the annular discs has a longer centering pilot on one end and a shorter centering pilot on the opposite end, both of which extend axially outwardly from each other to form a pressure transmitting part.

The pressure transmitting part offers the advantage that it can be used as a turn-around part to pull a roller bearing out of a bearing cylinder as well as press the fitting wheel flange hub into the roller bearing.

By designing the spacer in the inventive manner, it is possible to obtain the optimum strength-to-weight relationship for easy handling of the assembly device.

The face wall and support rings can all be threaded onto ends of the tubular spacer. This makes it simple and functionally reliable to fasten the support rings or the face wall to the spacer.

A further object of the invention is to provide an assembly device for pressing one cylindrical part into another cylindrical part, which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 2:
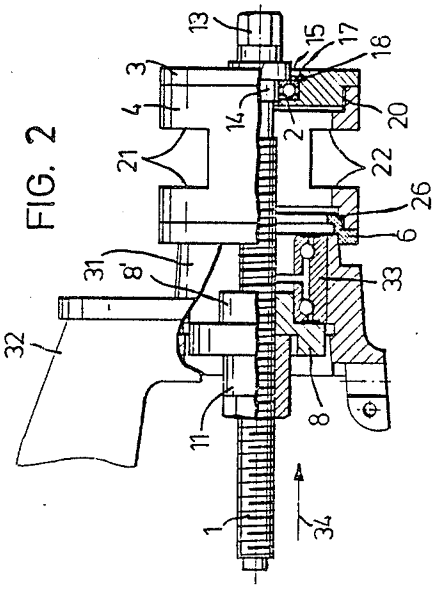
FIG. 2 is a sectional view, partly in elevation of the assembly device applied to a motor vehicle wheel bearing.

The assembly device illustrated in the drawings comprises a threaded spindle 1, an axial support bearing 2 which is concentrically inserted in a face wall 3 of a spacer 4 and seats the threaded spindle 1 concentrically. The device includes a number of support rings 5, 6 and 7 which can individually be fastened to the face of the spacer 4 opposite the face wall 3, and a number of pressure transmitting parts 8,9 and 10, each of which can be attached individually and selectively to the threaded spindle 1 and which can support themselves axially against a threaded nut 11 which can be screwed to the free end of the threaded spindle 1.

One end of the threaded spindle 1 is provided with a ring flange 12 and, behind it, with a wrench section 13, preferably of hexagonal shape. In addition, the threaded spindle has a cylindrical centering pilot 14 which centers it in the axial bearing 2. The axial bearing 2 is designed as a two-cup ball bearing seated in a coaxially disposed, cylindrical depression 15 in the face wall 3, which depression is open at the face, is of circular shape and has a central through hole 16 for the threaded spindle 1 to penetrate. The axial bearing 2 is secured in the depression 15 by means of a snap ring 17 seated in an annular groove 18. On its side opposite the depression 15 the face wall 3 has a threaded extension 19 which can be or is detachably screwed into a matching internal thread 20 at one end of the spacer 4. The face wall 3 is thus easily detachable from the spacer and can be exchanged for another, if desired.

The spacer 4 is in the shape of a cylindrical tubular part and has in its axial center, two diametrically opposed, window-like slots 21 and 22 which not only make it possible to look into its interior, but also result in a weight reduction. On its face opposite the face wall 3, the spacer 4 has an internal thread 23, into which one of the support rings 5, 6 or 7 which are also provided with a matching threaded lug or extension 24, can be screwed. It is evident that the support rings 5,6,7 each have on their faces opposite the threaded lugs 24, several annular support shoulders 25,26, 27,28,29 and 30, of different sizes. These support shoulders 25 to 30 of different sizes are meant for different bearing cylinders 31 of motor vehicles fastened to their axle legs 32 and intended to seat a roller bearing 33. Each bearing 33 is to be pressable into the bearing cylinder 31 or pullable out of it by means of the assembly device. The bearings 33 forms a first member which can be pressed in the cylinder 31, forming a second member.

Figures 3, 4, 5:
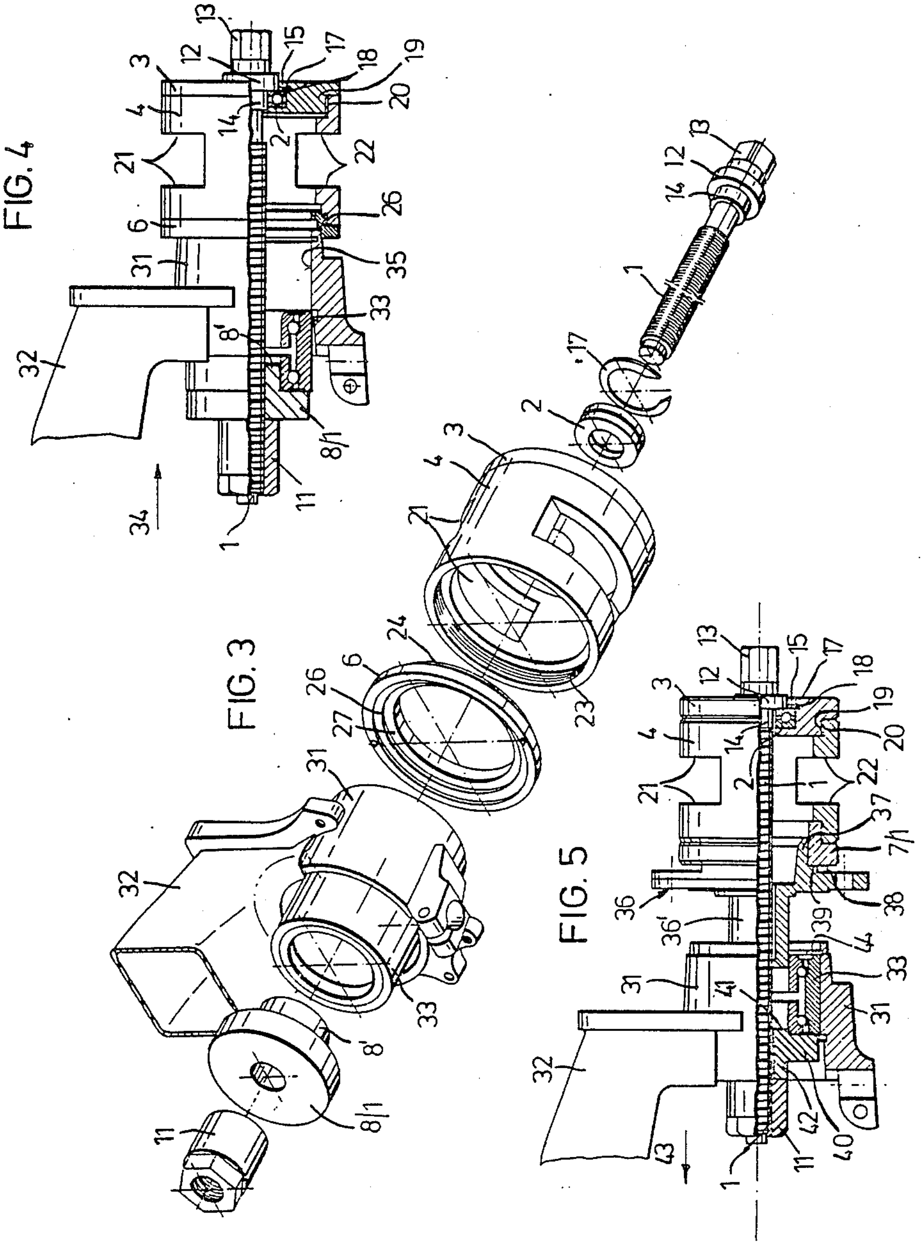
FIG. 3 is a view similar to FIG. 1 showing the assembly device of FIG. 1 as used to press a roller bearing into a bearing cylinder of a wheel bearing.
FIG. 4 is a view similar to FIG. 2 showing the assembly device of FIG. 3 while pressing the roller bearing into the bearing cylinder.
FIG. 5 is a view similar to FIG. 2 showing the assembly device while pressing a wheel flange hub into the roller bearing already assembled in the bearing cylinder.

The pressure transmitting parts 8, 9 and 10, essentially designed as cylindrical, annular discs of different diameters and each provided with cylindrical centering pilots 8', 9' 10', respectively, of different diameters, whch can selectably be attached to the threaded spindle 1, are of a shape tailored to different roller bearings 33 so thhat they can be accommodated by the bearings in the centering manner shown in FIG. 2 or FIG. 4.

Figure 1:
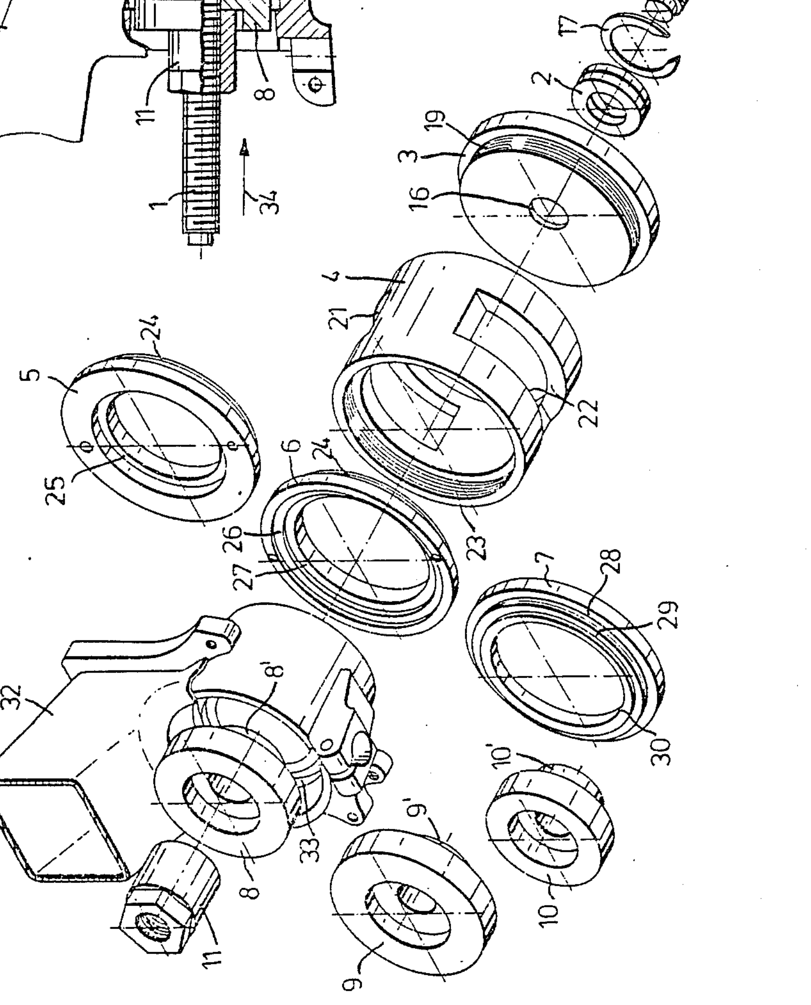
FIG. 1 is an exploded perspective view of an assembly device and a wheel bearing of a motor vehicle.

In FIGS. 1 and 2, the assembly device is shown as it is used for pulling a roller bearing 33 out of the bearing cylinder 31 of a motor vehicle axle leg 32. The support ring 6 selected in this case whose threaded extension 24 is screwed into the internal thread 23 of the spacer 4, is placed on the free face of the bearing cylinder 31, out of which the roller bearing 33 is to be pulled, to center the spacer 4. In this process, the threaded spindle 1, already sitting in the face wall 3 that is fastened to the spacer 4, penetrates the roller bearing 33 of the entire bearing cylinder 31. From the opposite side, the pressure transmitting part 8 is then loosely pushed over the threaded spindle 1, whereupon the threaded nut 11 is screwed on until the face area of the pressure transmitting part 89 surrounding the centring pilot 8', makes full contact with the face of the roller bearing 33. Then the threaded spindle is turned by means of a wrench placed on the wrench section 13 so that the threaded nut 11, which is prevented from co-rotating by means of a second wrench if necessaary, is pulled in the direction of arrow 34, thereby pushing the roller bearing 33 out of the bearing cylinder 31 into the cavity of the spacer 4. Centering the spacer 4 in the bearing cylinder 31 on the one hand and centering the pressure transmitting part 8 in the roller bearing 33 on the other assures that the pulling or pushing forces acting upon the roller bearing 33 are exactly oriented in the axial direction so as to preclude canting. To remove the loosened roller bearing 33 from the threaded spindle 1 it is, of course, necessary to unscrew the threaded nut 11. But this can be done after the entire assembly device has been pulled in the direction of arrow 34 out of the cylindrical bore of the bearing cylinder 31 in which the roller bearing 33 was fastened. For larger or smaller roller bearings, either the pressure transmitting part 9 or 10 may be used instead of the part 8. Analogously, the support rings 5 or 7 are available additionally for bearing cylinders 31 of different diameter. The diameter of the bearing 33 must also be no larger than the bore diameter through the center of spacer 4 and its support rings 5,6,7.

To press a roller bearing 33 into the cylindrical bore 35 of a bearing cylinder 31, the assembly device is used in the manner shown in FIGS. 3 and 4, which differs from that of FIGS. 1 and 2 only in that the pressure transmitting part 8/1 used here and also provided with a cylindrical centering pilot 8', accepts the roller bearing 33 in centering fashion before the latter is inserted into the cylindrical bore 35 of the bearing cylinder 31, and in that the entire length of the threaded spindle 1 is needed to press the roller bearing 33 into the bearing cylinder 31. The pressure transmitting part 8/1 differs from the pressure transmitting part 8 only in that it has no cylindrical recess on its face opposite the centering pilot 8' in which the threaded nut 11 partly immerses.

The assembly device can also be used in the manner shown in FIG. 5 to press a wheel flange hub 36 into a roller bearing 33 already installed in the bearing cylinder 31. For this purpose, the spacer 4 is provided on its side opposite the face wall 3 with a support ring 7/1 which accommodates a cylindrical hub extension 37 of the wheel flange hub 36 and whose outer face 38 rests against an annular shoulder 39 of the wheel flange hub 36. A pressure transmitting part 40 is provided as counterbearing on the end section projecting out of the roller bearing 33 on the opposite side. A short centering pilot 41 of part 40 protrudes slightly into the bore of the roller bearing 33 in centering fashion. The short centering pilot 41 having a maximum axial length of about 3 mm. The longer centering pilot 42 of part 40 on the opposite side, rests supportingly against the threaded nut 11 which is screwed to the free end of the threaded spindle 1. When, in this position, the distaance between the threaded nut 11 and the spacer 4 with the support ring 71 is shortened by turning the threaded spindle 1 while the threaded nut 11 is held from turning, the effect is at the same time that the bearing hub 36' is pushed in the direction of arrow 43 into the roller bearing 33 which is already fixed in the bearing cylinder 33 which is already fixed in the bearing cylinder 31 by a snap ring 44. It is evident here, too, that due to the centered accommodation of the wheel flange hub 36 in the support ring 7/1 on the one hand and the centered accommodation of the pressure transmitting part 40 in the roller bearing 33 on the other, a precisely coaxial configuration of the parts to be assembled and also on exactly coaxial action of forces active between the parts to be assembled are assured. Once the bearing hub 36' is pressed completely into the roller bearing 33, the entire assembly device is detached and removed by unscrewing the threaded nut 11 from the threaded spindle 1.

The above described example demonstrates that the assembly device according to the invention, consisting of few components which are easy to put together and also can be manufactured simply, can be used in a simple manner for three different operations, namely pressing a rolling bearing 33 into a bearing cylinder 31, pulling a roller bearing 33 out of a bearing cylinder 31, and pressing a wheel flange hub 36 into a roller bearing that is already installed in a bearing cylinder 31, it being assured in each case that the forces being applied become active in precisely axial direction.

While specific embodiments of the invention have been shown and described in detail to illustrate the application of the principles of the invention, it will be understood that the invention may be embodied otherwise without departing from such principles.

What is claimed is:

1. An assembly device for pressing a first member into the opening of a second member, in particular for axle bearings and/or wheel flange hubs of a motor vehicle, comprising a threaded spindle having an axis, an axial support bearing concentric with said axis, said axial support bearing having a hole therethrough for closely receiving a portion of said threaded spindle for centering said threaded spindle with respect to said axial support bearing, a tubular spacer concentric with said axis, said tubular spacer having a bore with said threaded spindle extending centrally through said bore, said tubular spacer having a face wall on one end thereof adjacent said axial support bearing, said axial support bearing being concentrically engaged with said face wall, said face wall partly closing said bore and having a hole therethrough axially aligned with said hole of said axial support bearing, an annular pressure transmitting part concentric with said axis, said pressure transmitting part having a hole therein for receiving said threaded spindle, said hole of said pressure transmitting part being axially aligned with said hole of said axial support bearing, said pressure transmitting part having an annular disc portion and at least one annular centering pilot portion extending axially of said disc portion in a direction toward said axial support bearing, said tubular spacer having at least one annular support shoulder at an end of said tubular spacer opposite from said face wall thereof, said annular support shoulder being disposed around said bore for engaging the second member, said pressure transmitting part being engageable with the first member, and a nut threaded to said threaded spindle near an end of said spindle opposite from said axial support bearing for pressing said pressure transmitting part toward said annular support shoulder for pressing the first member into and out of the second member.

2. An assembly device according to claim 1, wherein said facing wall has a cylindrical depression therein, said axial support bearing having a cylindrical outer contour and being seated in said cylindrical depression of said face wall, said face wall being detachably connected to said one end of said spacer.

3. An assembly device according to claim 1, including a plurality of support rings, each carrying at least one of said annular support shoulders, said annular support shoulders of said support rings having different diameters, one of said support rings being detachably connected to said opposite end of said spacer.

4. An assembly device according to claim 3, wherein said facing wall has a cylindrical depression therein, said axial support bearing having a cylindrical outer contour and being seated in said cylindrical depression of said face wall, said face wall being detachably connected to said one end of said spacer.

5. An assembly device according to claim 4, including a plurality of different annular pressure transmitting parts each with an annular disc portion and an annular centering pilot, said annular centering pilots of said different pressure transmitting parts having different diameters, one of said pressure transmitting parts being engaged on said threaded spindle at a time.

6. An assembly device according to claim 5, including a separate annular support ring detachably connected to said opposite end of said tubular spacer and carrying said at least one annular support shoulder, said support ring and said face wall both being threadably engaged to said spacer at opposite ends of said spacer.

7. An assembly device according to claim 3, wherein at least some of said support rings include a plurality of annular support shoulders having different diameters.

8. An assembly device according to claim 1, including a plurality of different annular pressure transmitting parts each with an annular disc portion and an annular centering pilot, said annular centering pilots of said different pressure transmitting parts having different diameters, one of said pressure transmitting parts being engaged on said threaded spindle at a time.

9. An assembly device according to claim 8, wherein one of said pressure transmitting parts has a first shorter annular centering pilot extending in one axial direction and a second longer annnular centering pilot extending in an opposite axial direction, said shorter centering pilot having a maximum axial length of about 3 mm.

10. An assembly device according to claim 1, wherein said tubular spacer is in the form of a hollow cylinder, said bore being cylindrical, said tubular spacer having two diametrically opposed window-like slots extending through said tubular spacer and communicating with said bore.

11. An assembly device according to claim 10, including a separate annular support ring detachably connected to said opposite end of said tubular spacer and carrying said at least one annular support shoulder, said support ring and said face wall both being threadably engaged to said spacer at opposite ends of said spacer.

12. An assembly device according to claim 1, including a separate annular support ring detachably connected to said opposite end of said tubular spacer and carrying said at least one annular support shoulder, said support ring and said face wall both being threadably engaged to said spacer at opposite ends of said spacer.

* * * * *